United States Patent
Miller et al.

(10) Patent No.: US 10,101,941 B2
(45) Date of Patent: Oct. 16, 2018

(54) DATA MIRROR INVALID TIMESTAMPED WRITE HANDLING

(71) Applicant: International Business Machines Corporation, Armonk, NY (US)

(72) Inventors: Dash D. Miller, St. Louis Park, MN (US); Miguel A. Perez, Miami, FL (US); David C. Reed, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 70 days.

(21) Appl. No.: 15/270,917

(22) Filed: Sep. 20, 2016

(65) Prior Publication Data

US 2018/0081549 A1 Mar. 22, 2018

(51) Int. Cl.
*G06F 12/00* (2006.01)
*G06F 3/06* (2006.01)

(52) U.S. Cl.
CPC .............. *G06F 3/065* (2013.01); *G06F 3/067* (2013.01); *G06F 3/0619* (2013.01); *G06F 3/0653* (2013.01)

(58) Field of Classification Search
CPC ...... G06F 3/065; G06F 3/0653; G06F 3/0619; G06F 3/067
See application file for complete search history.

(56) References Cited

U.S. PATENT DOCUMENTS

| | | | | |
|---|---|---|---|---|
| 4,933,940 A * | 6/1990 | Walter | ................... | G06F 9/4881 714/10 |
| 5,592,618 A * | 1/1997 | Micka | ................. | G06F 11/2074 711/162 |
| 6,301,643 B1 * | 10/2001 | Crockett | ............. | G06F 11/2064 711/111 |
| 6,480,970 B1 | 11/2002 | DeKoning et al. | | |
| 8,549,518 B1 * | 10/2013 | Aron | .................... | G06F 9/45558 718/1 |
| 8,762,328 B2 | 6/2014 | McCabe et al. | | |
| 9,258,363 B2 | 2/2016 | Rana et al. | | |

(Continued)

OTHER PUBLICATIONS

IBM, "Approach to Mirror Logging Data Stored in Volatile Storage", IP.com No. IPCOM000137440D, P.com Electronic Publication, Jun. 20, 2006.

(Continued)

*Primary Examiner* — Tuan Thai
*Assistant Examiner* — Tasnima Matin
(74) *Attorney, Agent, or Firm* — Kunzler, PC

(57) ABSTRACT

For handling data mirror invalid timestamped write activities, an apparatus is disclosed. The apparatus includes a data mirror that mirrors write activities from a first storage device at a first site to a second storage device at a second site. The apparatus includes a time monitor that retrieves a timestamp for each of the mirrored write activities and monitors a reference clock in a storage control session as a comparison to validate the timestamp for each of the mirrored write activities. If the timestamp of a mirrored write activity is outside of a pre-determined parameter range, then the time monitor identifies the mirrored write activity as having a missing timestamp, assigns a next logical timestamp to the mirrored write activity, and prepares the mirrored write activity for inclusion in a consistency group associated with the next logical timestamp.

19 Claims, 6 Drawing Sheets

(56) References Cited

U.S. PATENT DOCUMENTS

| | | | | |
|---|---|---|---|---|
| 9,432,298 B1* | 8/2016 | Smith | ................. | H04L 49/9057 |
| 2003/0028726 A1* | 2/2003 | Gaertner | ............. | G06F 11/2066 |
| | | | | 711/114 |
| 2003/0217292 A1* | 11/2003 | Steiger | ................. | H04L 63/126 |
| | | | | 726/3 |
| 2006/0117216 A1* | 6/2006 | Ikeuchi | ............... | G06F 11/0727 |
| | | | | 714/6.2 |
| 2007/0185938 A1* | 8/2007 | Prahlad | ............. | G06F 17/30212 |
| 2007/0220328 A1* | 9/2007 | Liu | .................... | G06F 11/1435 |
| | | | | 714/24 |
| 2009/0271435 A1* | 10/2009 | Yako | ................. | G06F 17/30356 |
| 2014/0089265 A1* | 3/2014 | Talagala | ............ | G06F 17/30551 |
| | | | | 707/674 |

OTHER PUBLICATIONS

Anonymous, "Lightweight metadata timestamp validation", IP.com No. IPCOM0000202158C, IP.com Electronic Publication, Dec. 6, 2010.

Bertrand Dufrasne et al., "IBM z/OS Global Mirror Planning, Operations, and Best Practices", ibm.com/redbooks, Oct. 2013.

* cited by examiner

DATA MIRROR INVALID TIMESTAMPED WRITE HANDLING

FIELD

The subject matter disclosed herein relates to a system, apparatus, and method for data storage backup and more particularly relates to handling data mirror invalid timestamped write activities.

BACKGROUND

In modern software mirroring solutions, mirroring software is dependent on accurate timestamps from writes to primary disk. If a write having an inaccurate or invalid timestamp is read in by the mirroring software, then the software can 'hold' that update and not apply the update to a consistency group on a secondary DASD (Direct Access Storage Device). In some instances, this can lead to either a potential out-of-sequence write at the secondary DASD or a 'suspend' because the mirror cannot advance the consistency group time accurately. In some other instances, modern data recovery solutions and actions can take hours because of a full initialization of the data mirror.

BRIEF SUMMARY

To overcome the deficiencies of modern software mirroring and recovery solutions, various implementations of the present disclosure may ignore invalid timestamp writes and provide them with a next appropriate consistency group time. Further, various implementations of the present disclosure may assist with data recovery time by allowing writes to a secondary storage device (DASD) to conclude so that the mirror may continue without suspension. Still further, various implementations of the present disclosure may provide a means for identifying specific datasets that experience these invalid timestamp writes. In this instance, knowing which datasets are involved may assist with identifying problematic applications through System Management Facility (SMF) records.

An apparatus for handling data mirror invalid timestamped write activities is disclosed. In one embodiment, the apparatus includes a data mirroring module that mirrors write activities from a first storage device at a first site to a second storage device at a second site. The apparatus includes a time monitoring module that retrieves a timestamp for each of the mirrored write activities and monitors a reference clock in a storage control session as a comparison to validate the timestamp for each of the mirrored write activities. If the timestamp of a mirrored write activity is outside of a pre-determined parameter range, then the time monitoring module identifies the mirrored write activity as having a missing timestamp, assigns a next logical timestamp to the mirrored write activity, and prepares the mirrored write activity for inclusion in a consistency group associated with the next logical timestamp.

A system for handling data mirror invalid timestamped write activities is disclosed. In one embodiment, the system includes a first storage device at a first site and a second storage device at a second site that is separated from the first site by an extended distance. The system includes a data mover that provides for data replication over the extended distance between the first and second storage devices for continuity and disaster recovery of data related to write activities. The data mover includes a data mirror that mirrors the write activities from the first storage device at the first site to the second storage device at the second site. The data mover includes a time monitor that retrieves timestamps for the mirrored write activities and monitors a reference clock in a storage control session as a comparison to validate the timestamps for the mirrored write activities. If a timestamp of a mirrored write activity is within a pre-determined parameter range, then the time monitoring module classifies the timestamp as a valid timestamp. If the timestamp of the mirrored write activity is outside of the pre-determined parameter range, then the time monitoring module classifies the timestamp as an invalid timestamp, identifies the mirrored write activity having the invalid timestamp as having a missing timestamp, assigns a next logical timestamp to the mirrored write activity, and prepares the mirrored write activity for inclusion in a consistency group associated with the next logical timestamp.

A method for handling data mirror invalid timestamped write activities is disclosed. In one embodiment, the method includes mirroring write activities received from a first storage device at a first site to a second storage device at a second site. The method includes retrieving a timestamp for each of the mirrored write activities and monitoring a reference clock in a storage control session for comparison to validate the timestamp for each of the mirrored write activities. If the timestamp of a mirrored write activity is outside of a pre-determined parameter range, then the method includes identifying the mirrored write activity as having a missing timestamp, assigning a next logical timestamp to the mirrored write activity, and preparing the mirrored write activity for inclusion in a consistency group associated with the next logical timestamp.

A computer program product that performs the functions of the method is disclosed. In one embodiment, the computer program product includes a computer readable storage medium having program instructions embodied therewith, the program instructions readable/executable by a processor to cause the processor to mirror write activities received from a first storage device at a first site to a second storage device at a second site, retrieve a timestamp for each of the mirrored write activities, and monitor a reference clock in a storage control session for comparison to validate the timestamp for each of the mirrored write activities. If the timestamp of a mirrored write activity is outside of a pre-determined parameter range, then the processor identifies the mirrored write activity as having a missing timestamp, assigns a next logical timestamp to the mirrored write activity, and prepares the mirrored write activity for inclusion in a consistency group associated with the next logical timestamp.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
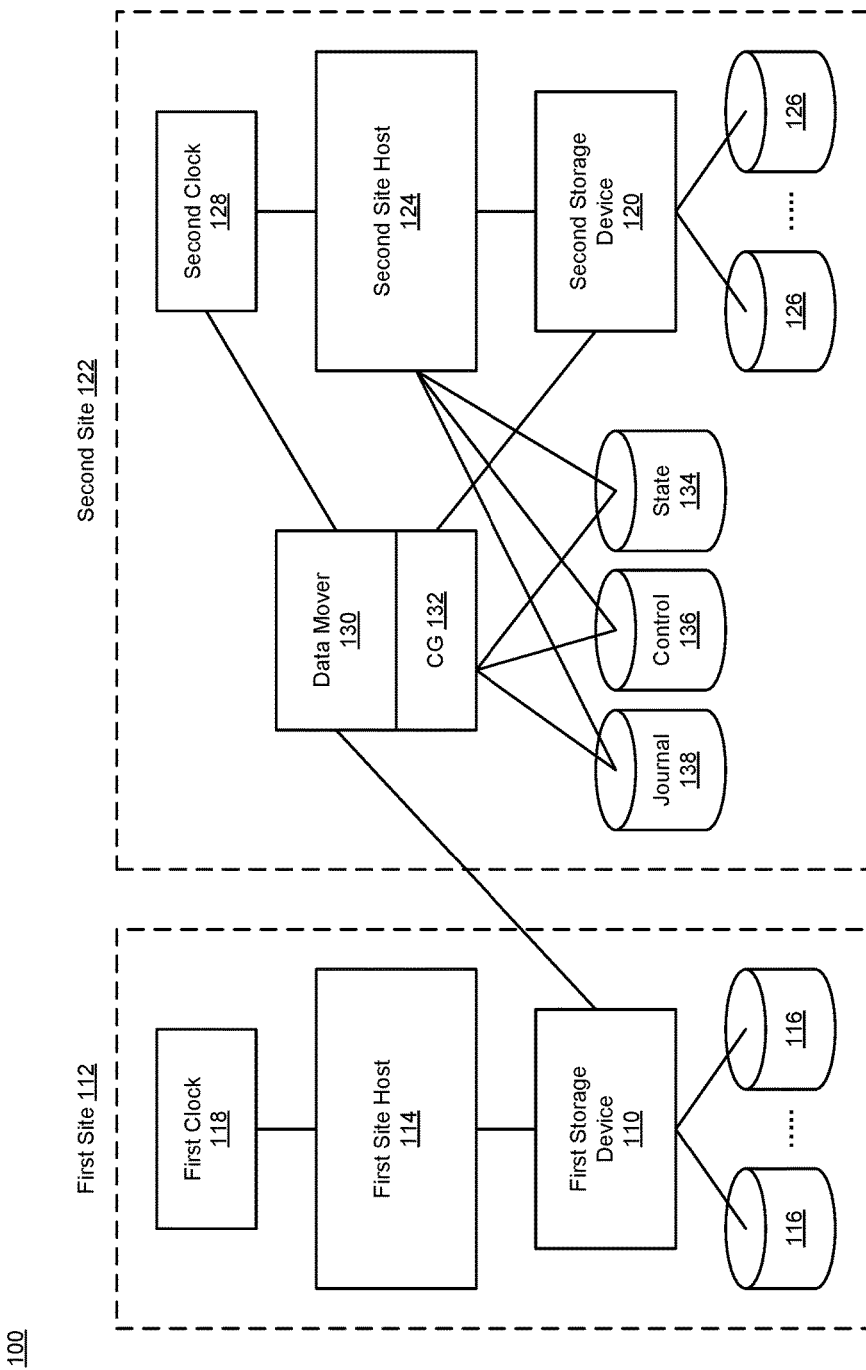
FIG. 1 is a schematic block diagram illustrating a computing environment for mirroring write activities from a first storage device at a first site to a second storage device at a second site.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

FIG. 1 is a schematic block diagram illustrating a computing environment and related system 100 for mirroring data and information associated with write activities from a first storage device or apparatus 110 at a first site 112 to a second storage device or apparatus 120 at a second site 122. The second storage device 120 at the second site 122 may be separated from the first site 112 by an extended distance.

The first storage device 110 may be referred to as a primary storage device, and the first site 112 may be referred to as a primary site. The first storage device 110 may also be referred to as a local storage device. In some cases, the first storage device 110 may be in communication with a first or primary site host device or system 114, and the first storage device 110 in combination with the first site host device 114 may be referred to as a primary system, application system, region 1 system, or a local system, where applications run and generate write activities for storage in one or more memory devices, such as, e.g., one or more first databases 116.

The first storage device 110 may utilize a first reference clock 118 as a first timing source or timer for timestamping various write activities generated and recorded by the first storage device 110. The first reference clock 118 may be referred to as a local reference clock that provides a current time of day (TOD) related to write activities of a particular storage session. Timestamps for write activities are provided in sequential order, and each sequential timestamp may include a next logical timestamp having a clock value associated with the storage control session. The first reference clock 118 may provide for time synchronization with a timestamp value that is based on a global time value.

The second storage device 120 may be referred to as a secondary or auxiliary storage device, and the second site 122 may be referred to as a secondary or auxiliary site. The second storage device 120 may also be referred to as a remote storage device. In some cases, the second storage device 120 may be in communication with a second, secondary, or auxiliary site host device or system 124, and the second storage device 120 in combination with the second site host device 124 may be referred to as a secondary system, auxiliary system, recovery system, region 2 system, or remote system that is used to take over the role of the first or primary system to run applications and/or generate write activities in various scenarios when the first or primary system is no longer available for use. The data from the first or primary system is available for use on the second system via storage in one or more second memory devices, such as, e.g., one or more second databases 126. This availability of stored data may be accomplished through mirroring data and information related to write activities using data replication and other data backup and recovery techniques as described herein.

The second storage device 120 may utilize a second reference clock 128 as a second timing source or timer for checking and/or verifying timestamps of various write activities mirrored from the first storage device 110. The second reference clock 128 may be referred to as a remote reference clock that provides a current time of day (TOD) related to a particular storage control session related to mirrored write activities. As described in greater detail herein below, when an invalid timestamp is identified, the second reference clock 128 may be used to provide a next logical timestamp as a replacement timestamp having a clock value of a last valid timestamp of the storage control session plus one time increment of the clock value of the last valid timestamp. In some cases, similar to the first reference clock 118, the second reference clock 128 may provide for time synchronization with a timestamp value that is based on a global time value.

The system 100 includes a data mover 130 that provides for data replication (i.e., remote copy implementation) over the extended distance between the first and second storage devices 110, 120 for continuity and disaster recovery of the data and information associated with write activities. The data mover 130 may be referred to as a system data mover (SDM) that communicates with the first and second storage devices 110, 120. The data mover or SDM 130 mirrors write activities from the first storage device 110 at the first site 112 to a second storage device 120 at the second site 122. The data mover or SDM 130 receives data associated with the mirrored write activities from the first storage device 110 at the first site 112 and provides the data associated with the mirrored write activities to the second storage device 120 at the second site 122.

The data mover 130 may communicate with the first storage device 110 so as to access data related to write activities that are stored in the first databases 116 or some other memory device that may serve as a cache, where a linked list of updates (e.g., record sets of write activities) is located before being read by the data mover 130. The updates to the first databases 116 may be stored in first volumes and managed by a particular storage control session. The first storage device 110 provides hardware bitmaps to the data mover 130 for tracking data that has not been sent to the second storage device 120. The tracking data is used for resynchronization, if data replication suspends.

The data mover 130 may communicate with the second storage device 110 so as to access mirrored data related to mirrored write activities that are stored in the second databases 126 that are physical storage units where a collection of mirrored volumes are located. This collection of mirrored volumes may be mirrors of the first volumes of the first storage device 110, or some subset thereof. The second storage device 120 is able to rebuild and run the production environment for data recovery in the event of a loss of production processing capabilities at the first site 112.

The data mover 130 may be coupled to the second reference clock 128, and the data mover 130 is able to retrieve timestamps having clock values related to a current time of day (TOD) associated with particular storage sessions. In some cases, as shown in FIG. 1, the data mover or SDM 130 is located and runs at the second site 122. In other cases, the data mover or SDM 130 may be located and may run at the first site 112.

The data mover 130 records the mirrored write activities in a consistency group (CG) 132 in sequence by time order based on the timestamp of each mirrored write activity. Further, the data mover 130 is able to identify and correct invalid timestamps for mirrored write activities. For instance, in some cases, the data mover 130 retrieves a timestamp for each of the mirrored write activities and monitors the second reference clock 128 in the storage control session as a comparison to validate the timestamp for each of the mirrored write activities. If the timestamp of a mirrored write activity is outside of a pre-determined parameter range, then the data mover identifies the mirrored write activity as having a missing timestamp, assigns a next logical timestamp to the mirrored write activity, and prepares the mirrored write activity for inclusion in a consistency group 132 associated with the next logical timestamp.

The consistency group 132 includes a record of the mirrored write activities that are sequenced in sequential order based on the timestamp of each mirrored write activity, and after timestamp correction, the next logical timestamp of the mirrored write activity preserves the sequential order of the mirrored write activities. In some cases, the next logical timestamp is a replacement timestamp having a clock value of a last valid timestamp of the storage control session plus one time increment of the clock value of the last valid timestamp. Valid timestamps for the mirrored write activities refer to mirrored write activities having timestamps within the pre-determined parameter range for the storage control session. Invalid timestamps for the mirrored write activities refer to mirrored write activities having timestamps outside the pre-determined parameter range for the storage control session.

In reference to timestamps, maintaining update sequence for applications whose data is being copied in real time is important for applications that run dependent write activities and operations. For instance, if data is copied out of time sequence, serious integrity exposures may inhibit recovery procedures from working properly. Thus, the data mover 130 helps to ensure consistency for write activity data associated with updates and mirrored data. When a record is written by an application to the first storage system 110, timestamps are attached to the data associated with write activities. The first storage device 110 keeps the record together with the timestamp in cache, and the data mover 130 reads the records from the cache, including the timestamp information for each write activity to ensure data consistency. In reference to consistency groups (CG) 132, the data mover 130 holds or stores update write activities (as mirrored write activities) that were read from the first storage device 110 in memory buffers, and the data mover 130 orders these update write activities (or mirrored write activities) into consistency groups (CGs) 132. In some cases, the consistency groups (CGs) 132 may include records that have their order of update preserved based on the timestamp information. This preservation of sequential order is important for dependent write activities and operations that are used, such as databases and logs. The creation of CGs 132 may ensure that data mover 130 applies the updates or mirrors to the secondary volumes with consistency for various types of data.

As described herein, the data mover 130 communicates with the first storage device 110 for connectivity to the first volumes of data stored in the first databases 116, and the data mover 130 communicates with the second storage device 120 for connectivity to the second mirrored volumes of mirrored data stored in the second databases 126. When applications perform write activities and write to the first volumes, the data mover 130 manages the process of mirroring updates to the second mirrored volumes, and the data mover 130 ensures that updates to the second mirrored volumes are made in a same order in which they were made to the first volumes, maintaining sequence consistency. Further, the data mover 130 performs recovery processes, including applying remaining updates to form a consistency group to the second storage device 120, relabeling second mirrored volumes and making them ready for use at the second site 122 (e.g., recovery site).

The data mover 130 may utilize a state data set 134, a control data set 136, and a journal data set 138. The state data set 134 serves as a table of contents for the storage control session. The state data set 134 may include a status of the storage control session and a status of related volumes that the storage control session is managing. The state data set 134 may also store session performance information. The control data set 136 may include consistent group information about the second mirrored volumes and journal data sets. The control data set 136 may also include information that is necessary for recovery operations. The journal data set 138 may include temporary user data that may have changed at the first volumes and read by the data mover 130. The data mover 130 may write data that forms a consistency group to the journal data set 138 to harden the data before the data mover 130 applies the data to the second mirrored volumes.

Figure 2:
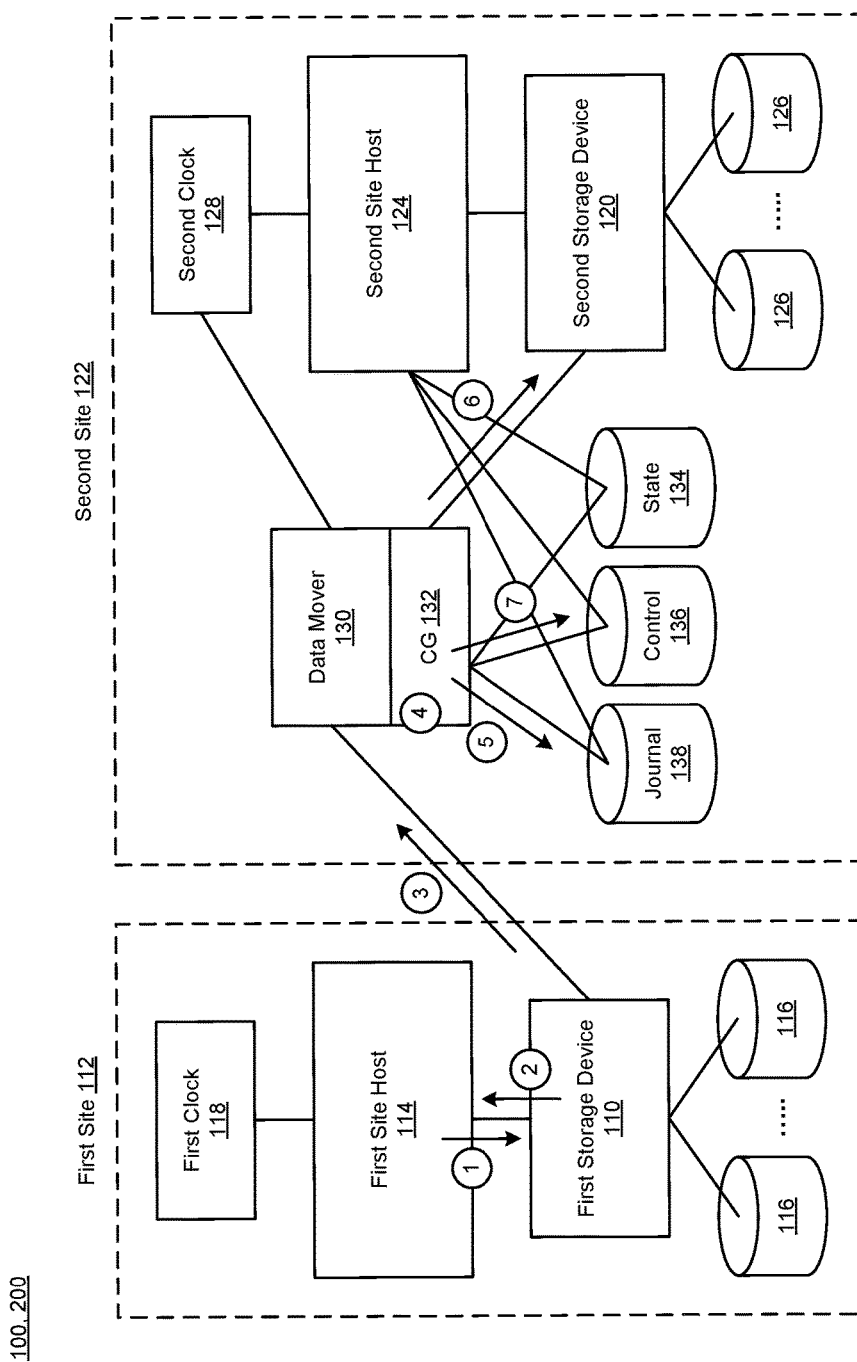
FIG. 2 is a schematic block diagram illustrating one embodiment of a data flow for mirroring write activities between first and second storage devices.

FIG. 2 is a schematic block diagram illustrating one embodiment of a data flow 200 for mirroring write activities in the computing system 100 between the first and second storage devices 110, 120.

In the process flow 200 of FIG. 2, in a first process (1), the first site host 114 writes to the first storage device 110. In a second process (2), the application write operation completion is signaled from the first storage device 110 to the first site host 114 when the data is written to the cache of the first storage device 110. After the application write I/O operation has completed, the updated data is mirrored asynchronously by the data mover 130 from the first storage device 110 to the second storage device 120. In a third process (3), the first storage device 110 groups the updates into record sets in the cache, and these groups are asynchronously offloaded from the cache of the first storage device 110 to the data mover 130. In a fourth process (4), the record sets from the first storage device 110 are processed into consistency groups (CGs) 132 by the data mover 130. The CG 132 includes records that have their sequential order of update preserved base don timestamps. In a fifth process (5), when the CG 132 is formed, the data mover 130 stores the CG 132 in real storage buffers to the journal dataset 138. In a sixth process (6), after the CG 132 has been hardened on the journal dataset 138, the records are written to the second storage device 120. Those records may also be written from real storage buffers of the data mover 130. In some cases, because the data is in transit between the first and second sites 112, 122, the data at the second site 124 stored by the second storage device 120 may be slightly less current than the data at the first site 112 stored by the first storage device 110. In a seventh process (7), the control dataset 136 may be updated to reflect that the records in the CG 132 have been written to the second storage device 120 and to reflect the consistency time of the volume group.

Along with processes (1)-(7), the data mover 130 monitors the current time of day clock 128 and other timestamps in a same storage control session as a comparison to validating the timestamps of updates or mirrored write activities. If the timestamp on a write activity is found to be outside of acceptable parameters, the data mover 130 treats the write activity as if the timestamp was missing, assigns a new next logical timestamp to the write activity, and prepares the mirrored write activity to be included in the consistency group (CG) 132. In some cases, the data mover 130 is able to continue mirroring write activities without suspension with valid and invalid timestamped write activities applied in sequential order to the second storage device 120. Thus, due to the continuation of write activities without suspension, recovery actions will not involve ending the storage control session and performing a full copy for the volumes involved. Accordingly, the techniques described herein may reduce risk of any down time experienced with invalid timestamped writes and log diagnostic information to assist with problem determination.

Figure 3:
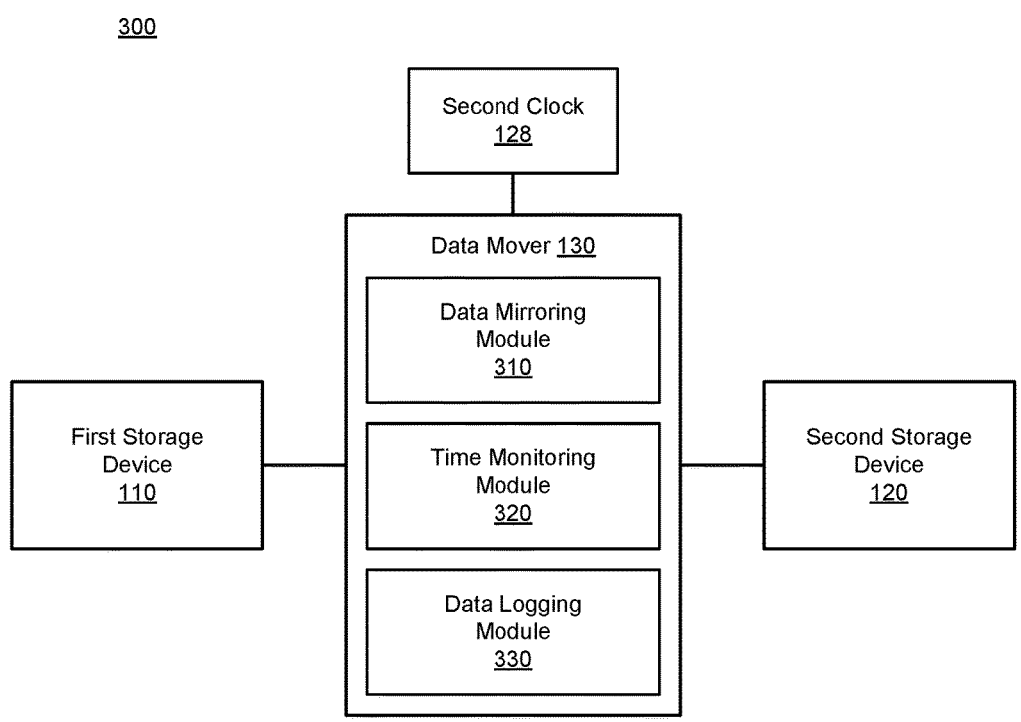
FIG. 3 is a schematic block diagram illustrating one embodiment of a data mover for mirroring write activities.

FIG. 3 is a schematic block diagram 300 illustrating one embodiment of the data mover 130 for mirroring write activities.

As shown in FIG. 3, the data mover 130 may include one or more modules including a data mirroring module 310, a time monitoring module 320, and a data logging module 330. As described herein, the data mover 130 utilizes the data mirroring module 310 and the time monitoring module 320 for data replication over the extended distance between the first and second storage devices 110, 120 for continuity and disaster recovery of data related to write activities. Further, the data mover 130 may utilize the data logging module 330 to log diagnostic information related to the mirrored write activities having timestamps outside of the pre-determined parameter range. In some cases, the diagnostic information may refer to an error log of invalid timestamps and related data.

Figure 4:
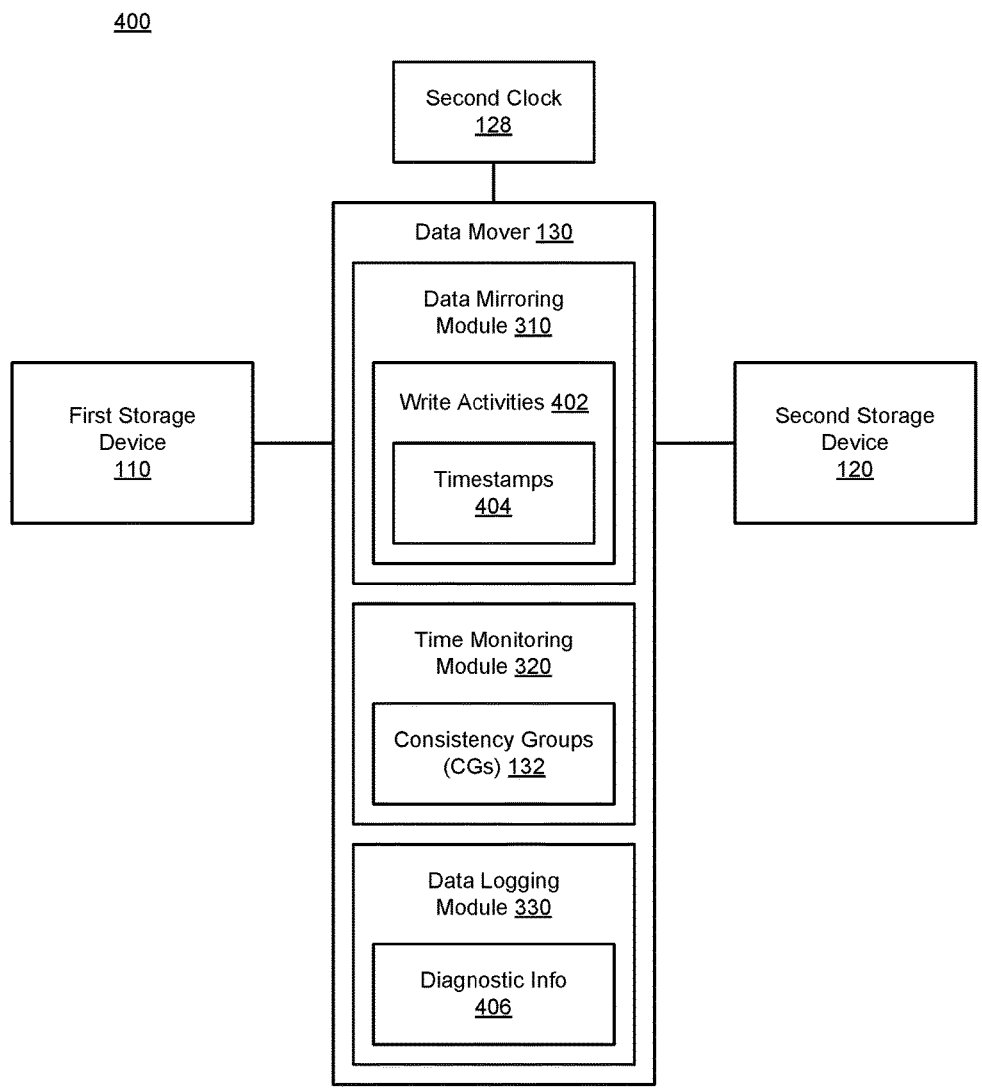
FIG. 4 is a schematic block diagram illustrating another embodiment of a data mover for mirroring write activities.

FIG. 4 is a schematic block diagram 400 illustrating another embodiment of the data mover 130 for mirroring write activities 402.

The data mirroring module 310 mirrors write activities 402 from the first or primary storage device 110 at the first or primary site 112 to the second or secondary storage device 120 at the secondary site 122. The time monitoring module 320 retrieves a timestamp 404 for each of the mirrored write activities 402 and monitors the second reference clock 128 in the storage control session as a comparison to validate the timestamp 404 for each of the mirrored write activities 402.

If the timestamp 404 of the mirrored write activity 402 is outside of a pre-determined parameter range, then the time monitoring module 320 identifies the mirrored write activity 402 as having a missing timestamp, assigns a next logical timestamp to the mirrored write activity 402, and prepares the mirrored write activity 402 for inclusion in the consistency group (CG) 132 associated with the next logical timestamp. Further, after preparing the mirrored write activity for inclusion in the consistency group 132, the data mirroring module 310 continues mirroring write activities 402 without suspension in sequential order based on the timestamp 404 of each mirrored write activity 402.

In some implementations, the comparison to validate the timestamp 404 for each of the mirrored write activities 402 includes first and second checks. With each record set (i.e., a structure including write specifics along with the write data itself) read in from the first storage device 110, these added checks may be included to compare timestamps during validation of a record set header. For instance, in a first check, the time monitoring module 320 may compare the timestamp 404 of each mirrored write activity 402 with the second reference clock 128. The first check may compare a host TOD clock with the write activity timestamp, taking into consideration any offsets between the first and second storage devices 110, 120. Unacceptable general criteria may be invalid year, month, day, or some window of time that may be adjusted by the data mover 130 via various parameter and time settings. In a second check, the time monitoring module 320 may compare the timestamp 404 of each mirrored write activity 402 with recent reads of other mirrored write activities 402 from the same storage control session. In some cases, if the first check is within valid parameters, a second check may compare the timestamp with recent reads from a same storage control session. The second check may use a next record set or group of record sets from the same storage control session for comparison. If the comparison falls within an acceptable margin of error (i.e., pre-determined parameters) defined by the data mover 130 via the various parameter and time settings, then the data mover 130 may consider these timestamps valid.

The data logging module 330 logs diagnostic information 406 associated with the mirrored write activities 402 having timestamps 404 outside of the pre-determined parameter range, including the mirrored write activity having the next logical timestamp and the consistency group 132 associated with the next logical timestamp. In some cases, the logged diagnostic information may include an error log of data and information related to invalid timestamps and their associated mirrored write activities.

For instance, if the first and/or second checks fail to indicate that an invalid timestamp has been detected, then the data mover 130 adjusts the invalid timestamp of the write activities. The new timestamp may be equal to the last known valid timestamp of the storage control session+1 tick of the TOD clock (e.g., 0.000001), thus treating it as a write activity without a timestamp. Sometimes, a new Unit Control Block (UCB) look service may then be used to identify the UCB of the first storage device 110 associated with a specific storage control session and a Common Cryptographic Architecture (CCA) of the associated record set. With the UCB, the data mover 130 may invoke CVAF services to obtain the Financial Transaction Manger (FMT1) Data Set Control Block (DSCB) of the dataset associated with the record set CCHHR (cylinder, track, and record) extent location. The FMT1 information may then be used to log the problem. In some cases, the error log entry includes the invalid timestamp along with the diagnostic information of the first storage device 110, CCHHR, volser, and dataset name involved with the record set. This information may be useful to assist with finding and/or identifying which applications are introducing erroneous timestamps. Further, the data mover 130 may keep a count of how many log entries have been written. If a particular count is reached, then an alert or warning message may be issued to notify a user that the log needs to be reviewed.

Figure 5:
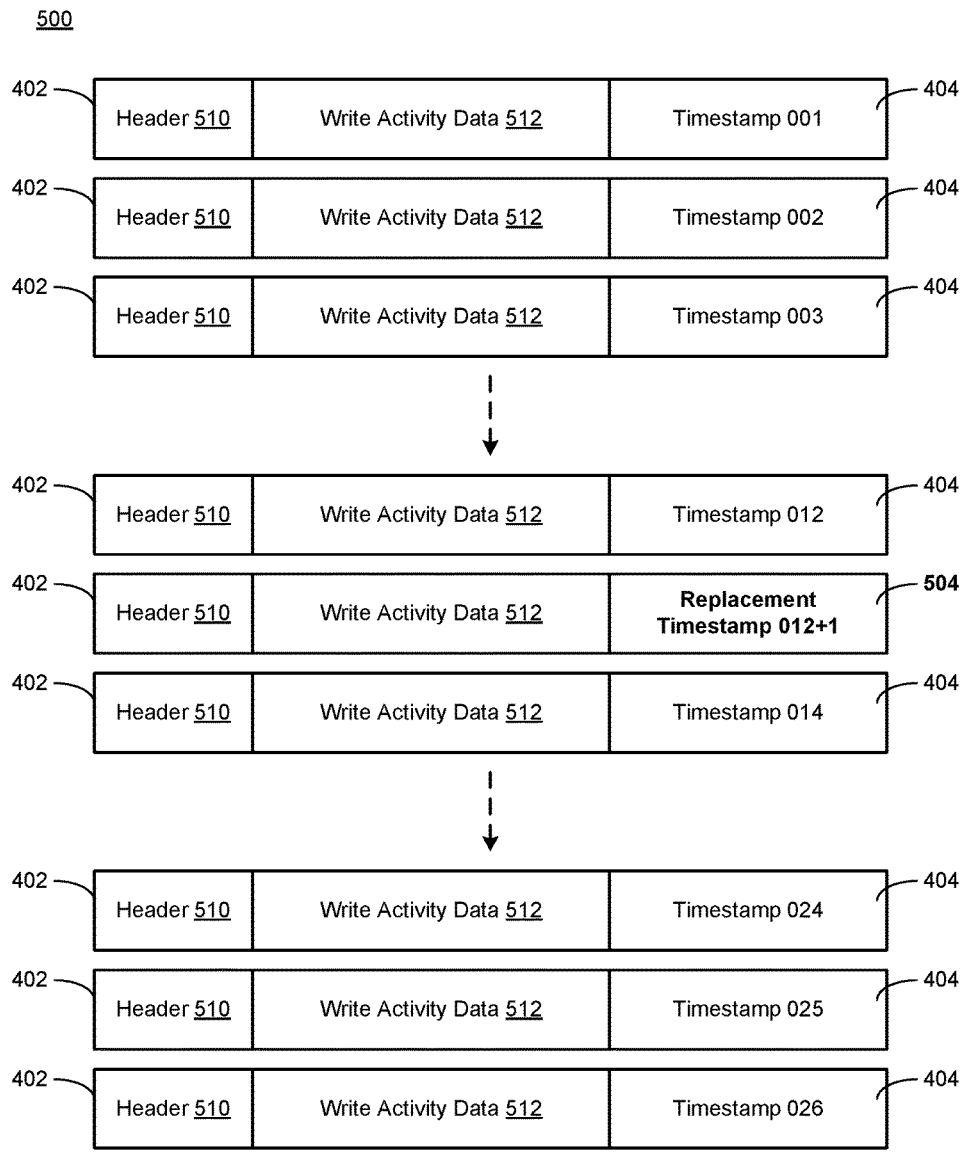
FIG. 5 is a diagram illustrating handling data mirror invalid timestamped write activities.

FIG. 5 shows a diagram 500 illustrating one embodiment of handling data mirror invalid timestamped write activities 402.

As shown in FIG. 5, each of the write activities 404 may include a header 510 and write activity data 512 along with the timestamp 404. The diagram 500 shown in FIG. 5 may refer to the consistency group 132 that includes a record of mirrored write activities 402 that are sequenced in sequential order (e.g., 001, 002, . . . , 026, etc.) based on the timestamp 404 of each mirrored write activity 402. As shown, one of the mirrored write activities 402, such as, e.g., write activity 502, may include a replacement timestamp 504 that may refer to a next logical timestamp of a mirrored write activity 502 that preserves the sequential order of the mirrored write activities 402. The next logical timestamp or replacement timestamp 504 may have a clock value (e.g., 012+001) of a last valid timestamp (e.g., 012) of the storage control session plus one time increment (e.g., 001) of the clock value of the last valid timestamp (e.g., 012). The replacement timestamp 504 of the next logical timestamp allows for the data mirroring module 310 to continue mirroring write activities 402 without suspension in sequential order based on the timestamp 404 of each mirrored write activity 402.

Figure 6:
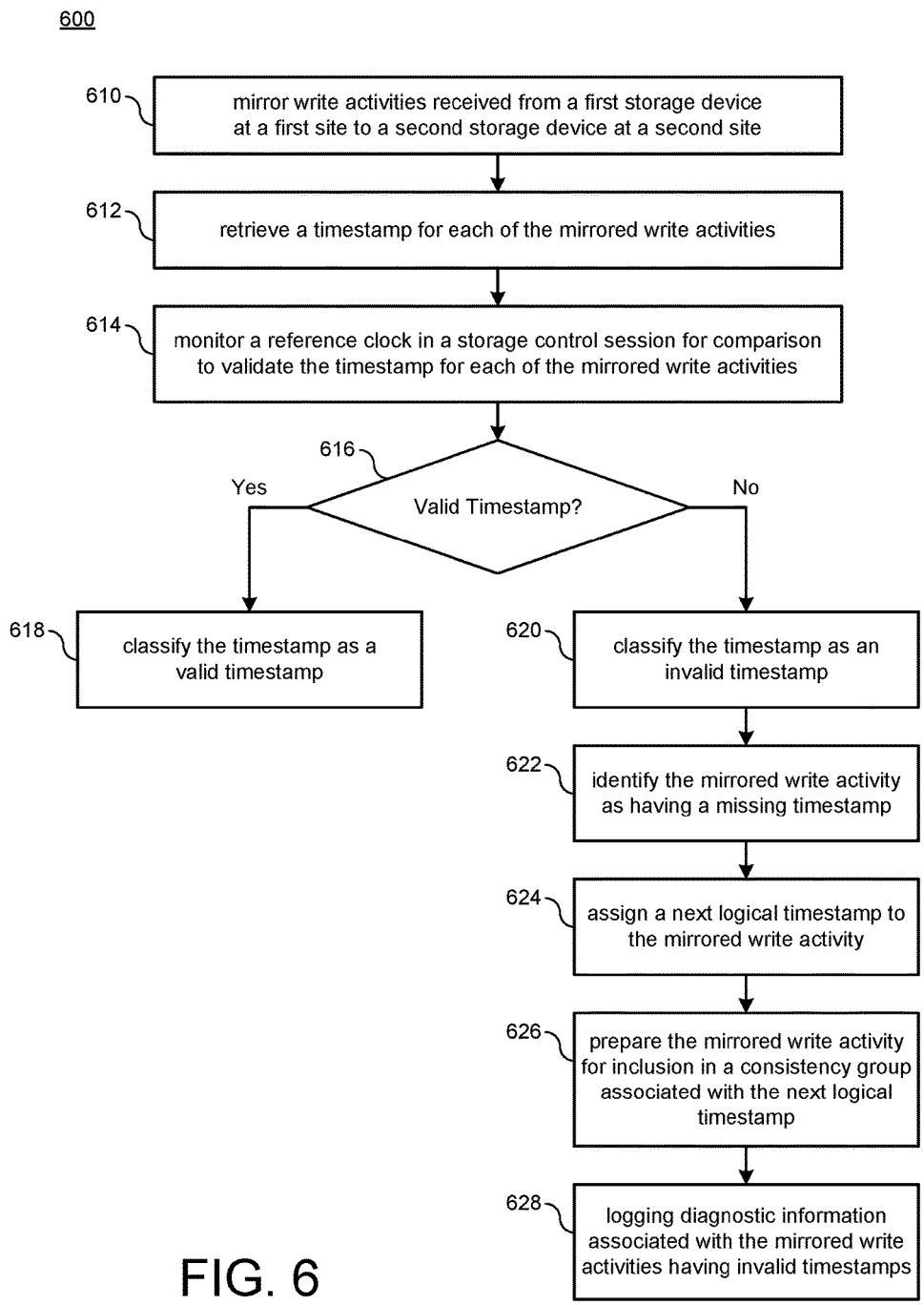
FIG. 6 is a schematic flow chart diagram illustrating one embodiment of a method for handling data mirror invalid timestamped write activities.

FIG. 6 is a schematic flow chart diagram illustrating one embodiment of a method 600 for handling data mirror invalid timestamped write activities.

In block 610, the method 600 mirrors write activities received from a first storage device at a first site to a second storage device at a second site. The method 600 is able to provide for communication between the first and second devices, and thus, the method 600 receives data associated with the mirrored write activities from the first storage device at the first site and provides the data associated with the mirrored write activities to the second storage device at the secondary site. The method 600 records the mirrored write activities in a consistency group in sequence by order based on the timestamp of each mirrored write activity. As described herein, the first site and the second site are separated by an extended distance, and as such, the method 600 provides for data replication over the extended distance between the first and second sites for continuity and disaster recovery of data related to the write activities.

In block 612, the method 600 retrieves a timestamp for each of the mirrored write activities. In block 614, the method 600 monitors a reference clock in a storage control session for comparison to validate the timestamp for each of the mirrored write activities. The reference clock may refer to a current time of day (TOD) clock associated with the storage control session. The comparison to validate the timestamp for each of the mirrored write activities may include first and second checks. In a first check, the timestamp of each mirrored write activity may be compared with the reference clock, and in a second check, the timestamp of each mirrored write activity may be compared with recent reads of other mirrored write activities from the same storage control session.

In block 616, the method 600 determines whether the time stamp is valid or invalid. In some cases, valid timestamps for the mirrored write activities refer to mirrored write activities having timestamps within the pre-determined parameter range. In some other cases, invalid timestamps for the mirrored write activities refer to mirrored write activities having timestamps outside the pre-determined parameter range.

In block 618, if the timestamp is within the pre-determined parameter range, and if the timestamp is thus determined to be valid, then the method 600 proceeds to block 618, and in block 618, the method 600 classifies the timestamp as a valid timestamp. In some cases, after validating the timestamp for each write activity, the method 600 continues mirroring write activities without suspension in sequential order based on the timestamp of each mirrored write activity.

Otherwise, in block 620, if the timestamp is outside of the pre-determined parameter range, and if the timestamp is thus determined to be invalid, then the method 600 proceeds to block 620, and in block 620, the method 600 classifies the timestamp as invalid. In block 622, the method 600 identifies the mirrored write activity as having a missing timestamp. In block 624, the method 600 assigns a next logical timestamp to the mirrored write activity. In block 626, the method 600 prepares the mirrored write activity for inclusion in a consistency group associated with the next logical timestamp. Further, in some cases, after preparing the mirrored write activity for inclusion in the consistency group, the method 600 continues mirroring write activities without suspension in sequential order based on the timestamp of each mirrored write activity.

The next logical timestamp is a replacement timestamp having a clock value of a last valid timestamp of the storage control session plus one time increment of the clock value of the last valid timestamp. The consistency group includes a record of the mirrored write activities that are sequenced in sequential order based on the timestamp of each mirrored write activity, and the next logical timestamp of the mirrored write activity preserves the sequential order of the mirrored write activities.

Further, in block 628, for invalid timestamps, the method 600 may include logging diagnostic information associated with the mirrored write activities having invalid timestamps that are outside of the pre-determined parameter range, including the mirrored write activity having the next logical timestamp and the consistency group associated with the next logical timestamp.

In some embodiments, a computer program product provides for mirroring data and information related to write activities from a primary storage device at a primary site to a secondary storage device at a secondary site, and the computer program product further provides for handling data mirror invalid timestamped write activities, as described about in reference to FIGS. 2-6. In one embodiment, the computer program product may include a computer readable storage medium having various program instructions that are readable/executable by a processor to cause the processor to perform embodiments of the method 600, as described above in reference to FIG. 6.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
   a data mirroring module that mirrors write activities from a first storage device at a first site to a second storage device at a second site; and
   a time monitoring module that retrieves a timestamp referencing a first time of a first reference clock on the first site for each of the mirrored write activities and monitors a second reference clock of the second storage site in a storage control session as a comparison of the first and second reference clocks to validate that the timestamp for each of the mirrored write activities on the second site corresponds to a respective write activity on the first site,
   wherein in response to the timestamp of a mirrored write activity being determined to be outside of a pre-determined time parameter range corresponding to the second reference clock, the time monitoring module:
      identifies the mirrored write activity as having a missing timestamp, assigns a next logical timestamp to the mirrored write activity, and
      prepares the mirrored write activity for inclusion in a consistency group associated with the next logical timestamp,
      wherein the next logical timestamp includes a current clock value corresponding to a previous clock value of a last valid timestamp referencing a second time of the second reference clock within the pre-determined time parameter range incremented one time count.

2. The apparatus of claim 1, wherein the reference clock comprises a current time of day clock associated with the storage control session.

3. The apparatus of claim 1, wherein the consistency group includes a record of the mirrored write activities that are sequenced in sequential order based on the timestamp of each mirrored write activity, and wherein the next logical timestamp of the mirrored write activity preserves the sequential order of the mirrored write activities.

4. The apparatus of claim 1, wherein valid timestamps for the mirrored write activities refer to mirrored write activities having timestamps within the pre-determined time parameter range.

5. The apparatus of claim 1, wherein invalid timestamps for the mirrored write activities comprises mirrored write activities having timestamps outside the pre-determined time parameter range.

6. The apparatus of claim 1, wherein the comparison to validate the timestamp for each of the mirrored write activities includes:
   in a first check, the time monitoring module comparing the timestamp of each mirrored write activity with the reference clock, and
   in a second check, the time monitoring module comparing the timestamp of each mirrored write activity with recent reads of other mirrored write activities from the same storage control session.

7. The apparatus of claim 1, wherein after preparing the mirrored write activity for inclusion in the consistency group, the data mirroring module continues mirroring write activities without suspension in sequential order based on the timestamp of each mirrored write activity.

8. The apparatus of claim 1, further comprising:
   a data logging module that logs diagnostic information associated with the mirrored write activities having timestamps outside of the pre-determined time parameter range, including the mirrored write activity having the next logical timestamp and the consistency group associated with the next logical timestamp.

9. The apparatus of claim 1, wherein the apparatus comprises a system data mover that communicates with the first storage device and the second storage device.

10. The apparatus of claim 9, wherein the system data mover receives data associated with the mirrored write activities from the first storage device at the first site and provides the data associated with the mirrored write activities to a second storage device at a second site.

11. The apparatus of claim 9, wherein the system data mover records the mirrored write activities in the consistency group in sequence by order based on the timestamp of each mirrored write activity.

12. The apparatus of claim 1, wherein the first site and the second site are separated by an extended distance, and wherein the data mirror module provides for data replication over the extended distance between the first and second sites for continuity and disaster recovery of data related to the write activities.

13. A system, comprising:
   a first storage device at a first site;
   a second storage device at a second site that is separated from the first site by an extended distance; and
   a data mover that provides for data replication over the extended distance between the first and second storage devices for continuity and disaster recovery of data related to write activities, the data mover including:
      a data mirror that mirrors the write activities from the first storage device at the first site to the second storage device at the second site, and
      a time monitor that retrieves timestamps referencing first times of a first reference clock on the first site for the mirrored write activities and monitors a second reference clock of the second storage site in a storage control session as a comparison of the first and second reference clocks to validate that the timestamps for the mirrored write activities on the second site correspond to a respective write activity on the first site, wherein if a timestamp of a mirrored write activity is within a pre-determined time parameter range, then the time monitoring module: classifies the timestamp as a valid timestamp, wherein if the timestamp of the mirrored write activity is outside of the pre-determined time parameter range, then the time monitoring module:
classifies the timestamp as an invalid timestamp,
identifies the mirrored write activity having the invalid timestamp as having a missing timestamp,
assigns a next logical timestamp to the mirrored write activity, and
prepares the mirrored write activity for inclusion in a consistency group associated with the next logical timestamp, and wherein the next logical timestamp includes a current clock value corresponding to a previous clock value of a last valid timestamp referencing a second time of the second reference clock within the pre-determined time parameter range incremented one time count.

14. The system of claim 13, wherein the reference clock comprises a current time of day clock related to the storage control session.

15. The system of claim 13, wherein the consistency group includes a record of the mirrored write activities that are sequenced in sequential order based on the timestamp of each mirrored write activity, and wherein the next logical timestamp of the mirrored write activity preserves the sequential order of the mirrored write activities.

16. The system of claim 13, wherein after preparing the mirrored write activity for inclusion in the consistency group, the data mirror continues mirroring write activities without suspension in sequential order based on the timestamp of each mirrored write activity.

17. The system of claim 13, wherein the data mover further comprises:
a data logger that logs diagnostic information associated with the mirrored write activities having timestamps outside of the pre-determined time parameter range, including the mirrored write activity having the next logical timestamp and the consistency group associated with the next logical timestamp.

18. A method, comprising:
mirroring write activities received from a first storage device at a first site to a second storage device at a second site;
retrieving a timestamp referencing a first time of a first reference clock on the first site for each of the mirrored write activities; and
monitoring a second reference clock of the second storage site in a storage control session for comparison of the first and second reference clocks to validate that the timestamp for each of the mirrored write activities on the second site corresponds to a respective write activity on the first site,
wherein if the timestamp of a mirrored write activity is outside of a pre-determined time parameter range, then:
identifying the mirrored write activity as having a missing timestamp,
assigning a next logical timestamp to the mirrored write activity, and
preparing the mirrored write activity for inclusion in a consistency group associated with the next logical timestamp, and
wherein the next logical timestamp includes a current corresponding to a previous clock value of a last valid timestamp referencing a second time of the second reference clock within the pre-determined time parameter range incremented one time count.

19. The method of claim 18, further comprising:
logging diagnostic information associated with the mirrored write activities having timestamps outside of the pre-determined time parameter range, including the mirrored write activity having the next logical timestamp and the consistency group associated with the next logical timestamp.

* * * * *